(12) United States Patent
Lee

(10) Patent No.: US 9,400,896 B2
(45) Date of Patent: Jul. 26, 2016

(54) PORTABLE COMPUTER AND SECURITY OPERATING METHOD THEREOF

(75) Inventor: Rong-Jung Lee, Tainan County (TW)

(73) Assignee: Getac Technology Corporation, Hsinchu County (TW)

( * ) Notice: Subject to any disclaimer, the term of this patent is extended or adjusted under 35 U.S.C. 154(b) by 2170 days.

(21) Appl. No.: 12/341,849

(22) Filed: Dec. 22, 2008

(65) Prior Publication Data

US 2009/0100526 A1     Apr. 16, 2009

Related U.S. Application Data

(63) Continuation-in-part of application No. 10/605,917, filed on Nov. 6, 2003, now abandoned.

(30) Foreign Application Priority Data

Jul. 10, 2003   (TW) ............................... 92118831 A

(51) Int. Cl.
*G06F 21/88*   (2013.01)
*G06F 21/83*   (2013.01)

(52) U.S. Cl.
CPC .............. *G06F 21/88* (2013.01); *G06F 21/83* (2013.01); *G06F 2221/2143* (2013.01)

(58) Field of Classification Search
CPC ..................................... G06F 1/3203
USPC ....................... 705/50–79; 713/324
See application file for complete search history.

(56) References Cited

U.S. PATENT DOCUMENTS

| | | | | |
|---|---|---|---|---|
| 5,590,396 A | * | 12/1996 | Henry | ............... H04W 52/0216 340/7.38 |
| 6,333,684 B1 | * | 12/2001 | Kang | ...................... G06F 21/34 340/5.54 |
| 2002/0099956 A1 | * | 7/2002 | Suzuki | .................... G06F 21/31 726/26 |
| 2005/0120242 A1 | * | 6/2005 | Mayer | .................... G06F 21/56 726/4 |

FOREIGN PATENT DOCUMENTS

JP     2000112585 A  *  4/2000  ................ G06F 1/32

* cited by examiner

*Primary Examiner* — James A Reagan

(57) ABSTRACT

A portable computer and security operating method thereof are provided to secure the portable computer in a power-off mode. The portable mainly includes a computer host, a system BIOS (Basic Input/Output System), an EC (Embedded Controller), an EC BIOS, one or more input device and a power device, all of which are in bus connection or circuit connection with each other. The EC includes a KBC (Keyboard Controller) and remains activated when the portable computer is in the power-off mode. Meanwhile, the EC is adapted so that in the power-off mode of the portable computer and upon receipt of a security signal, the EC executes a power-off-mode security routine of the EC BIOS to lock the portable computer in the power-off mode.

16 Claims, 5 Drawing Sheets

PORTABLE COMPUTER AND SECURITY OPERATING METHOD THEREOF

CROSS-REFERENCE TO RELATED APPLICATION

This application is continuation-in-part application of U.S. patent application Ser. No. 10/605,917, filed Jan. 13, 2005 and hereby incorporates the content of this application by reference.

BACKGROUND OF THE INVENTION

1. Field of the invention

The present invention pertains to secure technology of portable computer, and more particularly to security mechanism of a portable computer.

2. Description of the Related Art

Presently, a portable computer (for instance, a laptop computer) is getting popular. In a near future, it is possible for everybody to own a portable computer. However, as a data transferring technology gets mature, with a portable data-transferring device, data can be carried and transferred from one computer to the other computer conveniently. In between, data can also be stolen easily. Nowadays, a portable computer is commonly not equipped with a security system. It is possible for a top-secret data in a portable computer to get stolen in few minutes. Therefore, a portable computer security system is in a great need to protect a user data from being stolen.

SUMMARY OF THE INVENTION

Accordingly, the present invention provides a security operating method applied to a portable computer. Through the security operating method, security mechanism may be triggered in the power-off mode through the EC and EC BIOS. Subsequent power-on-mode security routines may be further applied to the portable computer if the power-off-mode security routine allows the portable computer to boot up afterwards In an embodiment of the present invention, a portable computer, includes a computer host, a display device, a system BIOS (Basic Input/Output System) ROM (Read-Only Memory), an EC (Embedded Controller), an EC BIOS ROM, at least one input device and a power device. The computer host includes at least one CPU (Central Processing Unit), at least one system memory, a north bridge and a south bridge in bus connections with each other. The display device is in bus connection with the north bridge. The system BIOS ROM is in bus connection with the south bridge and has a system BIOS stored therein. The EC includes a KBC (Keyboard Controller) and is in bus connection with the south bridge. The EC remains activated when the portable computer is in a power-off mode. The EC BIOS ROM is in bus connection with the EC and has an EC BIOS stored therein. The EC BIOS further includes a power-off-mode security routine. The input device in bus connection with the EC. The power device is in circuit connection with the EC and is controlled by the EC. The power device receives electricity from an external power input and/or a battery, and then outputs a system power to the whole portable computer. The EC is configured so that in the power-off mode of the portable computer and upon receipt of a security signal, the EC executes the power-off-mode security routine of the EC BIOS to lock the portable computer in the power-off mode.

In another embodiment of the present invention, a security operating method is disclosed and applied to a portable computer. The portable computer has a computer host, a system BIOS, an EC in bus connection with the computer host, an EC BIOS, an input device in bus connection with the EC, a display device, at least one battery, and a power control circuitry controlled by the EC. The EC includes a KBC and is supplied with system power from the power control circuitry in a power-off mode of the portable computer. The method comprises the following steps. First of all, the EC confirms that the portable computer is in the power-off mode. Next, the EC determines whether the EC receives a security signal generated in the power-off mode. If the security signal is received, the EC executes a power-off-mode security routine of the EC BIOS to lock the portable computer in the power-off mode.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF SPECIFIC EMBODIMENTS

Figure 1A:
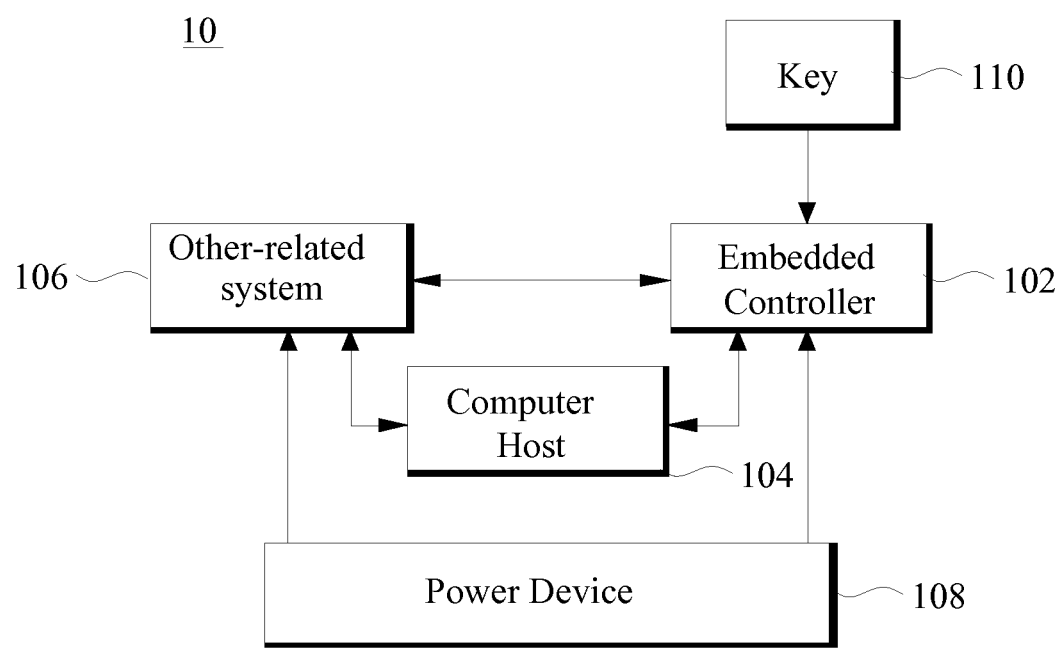
FIG. 1A demonstrates a system block diagram of a portable computer according to a preferred embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

Referring to FIG. 1A, a portable computer 10 according to the preferred embodiment of the present invention is disclosed. The portable computer 10 comprises an EC (Embedded Controller) 102, a computer host 104, an other-related system 106, power unit 108, and a key 110. The EC 102 is used to control certain operations of the computer host 104 and/or the other-related system 106. In the present invention, a security operating method is performed by the EC 102 when the portable computer 10 is in a power-off mode. The power-off mode in the present invention is defined as a state of the portable computer 10 in which system power/electricity is not supplied to the computer host 104. In the power-off mode, the EC 102 and a RTC (Real-Time Clock; not shown) still remain in a power-on mode; namely system power is still supplied to the EC 102 and RTC. The key 110 is configured accompanying with a key circuit (not shown) to generate a security signal upon the power-off mode of the portable computer 10 and send to the EC 102 so that the EC 102 is triggered by the security signal to perform the security operating method of the present invention and lock up the portable computer 10 in the power-off mode. The key 110 is, for instance, an internal key unit or an internal key function of the portable computer 10. For example, the key 110 can be a special key on a keyboard. When the key is pressed down, the EC 102 is noticed by the scan code type of security signal to learn that the portable computer 10 is instructed to be locked. Or, the key 110 can be a unit or a function of an external device. For instance, the key 110 can be a hardwired button of the portable computer 10 in circuit connection of the EC 102. Or, the key 110 can be a button on an infrared remote control device. When the button of infrared remote control device is pressed down in the power-off mode, an infrared signal is transmitted to the EC 102 to activate the security operating method accordingly. It is clear to those skilled in the art that the key 110 is any kind of input apparatus that notices the EC 102 to learn whether the portable computer 10 needs to be locked at the power-off mode of the portable computer 10.

Figure 1B:
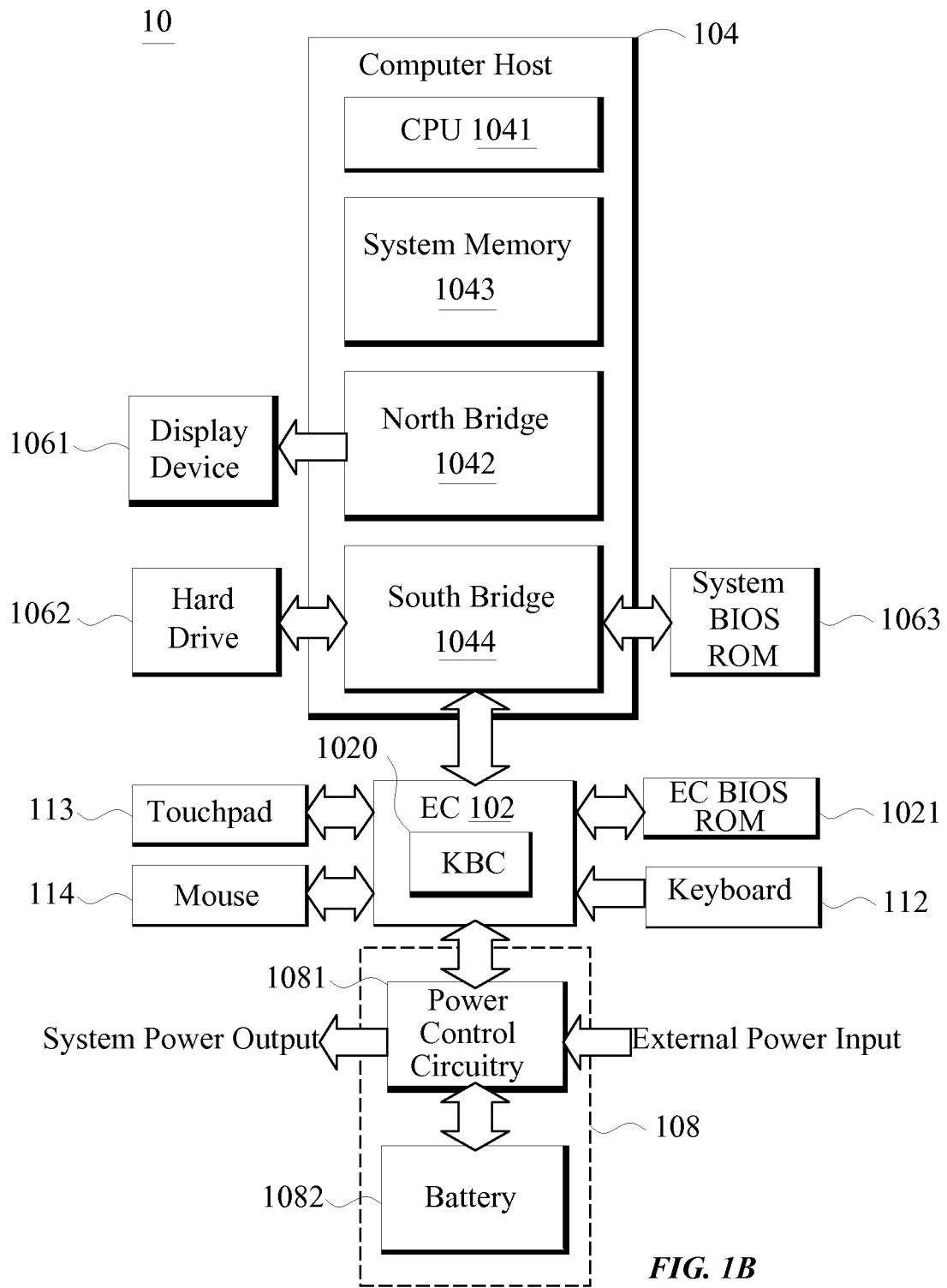
FIG. 1B is a detailed system block diagram of FIG. 1A.

Please refer to FIG. 1B, which shows a detailed system block diagram of FIG. 1A. The computer host 104 comprises CPU (Central Processing Unit) 1041, North Bridge 1042, system memory 1043 and South Bridge 1044. CPU 1041, North Bridge 1042, system memory 1043 and South Bridge 1044 are in bus connection (connecting through the bus) with each other for communications. In a preferred embodiment, CPU 1041 may be implemented with a memory controller (not shown) to have direct access to the system memory 1043. However, in other embodiments, CPU 10141 does not implement a memory controller. The interconnections between CPU 1041, North Bridge 1042 and system memory 1043 vary and depend on the capability of CPU 1041. North Bridge 1042 is generally in bus connection with display device 1061 to control the display function of the portable computer 10. South bridge 1044 also connects with hard drive 1062 and system BIOS (Basic Input/Output System) ROM (Read-Only Memory) 1063 through buses. The hard drive 1062 (or other storage device like solid-state drive) stores digital files and software such as operation system, applications and programs. The system BIOS ROM 1063 stores system BIOS which includes at least boot routines and boot loader, where the boot routines initialize hardware components of the portable computer 10 and execute POST (Power On Self Test) and the boot loader loads and activates the operating system upon or after execution of POST. In preferred embodiments, North Bridge 1042 and South bridge 1044 are integrated at least partially as a bridge chipset.

The power device 108 includes at least power control circuitry 1081 and battery 1082. The power device 108 receives electricity from external power input and/or the battery 1082, and then outputs system power to the whole portable computer. Preferably, the power control device 1081 is in bus connection with EC 102 and partially or completely controlled by EC 102. External power input is provided to the power control circuitry 1081. AC (Alternating Current) power will pass through an AC-DC (Direct Current) adapter to convert into a designated DC voltage. Generally the power control circuitry 1081 includes circuits and components such as DC-DC converters, battery charge circuits, power switches of predetermined components/modules/subsystems, switch circuit(s) of DC or AC power input, and other circuit elements. The power control circuitry 1081 may also comprises switches that control the hardwired communications of the non-keyboard physical buttons mentioned in the following.

Battery 1082 is in circuit connection (connecting through circuits) with the power control circuitry 1081. Through the power control circuitry 1081, the battery 1082 may be charged with the external power input when the portable computer 10 is in an AC-mode and is supplied with the external power input. In the AC-mode, the power control circuitry 1081 supplies system power to the components/modules/subsystems of the whole portable computer 10. Also through the power control circuitry 1081, in a battery mode of the portable computer 10, the battery 1082 inputs battery power as the system power to the components/modules/subsystems of the portable computer 10.

The EC 102 includes at least a KBC (Keyboard Controller) 1020. EC BIOS ROM 1021 and input devices such as keyboard 112, touchpad 113, mouse 114, and even an infrared module may be in bus connection with EC 102. The system BIOS ROM 1063 may also be in bus connection with the EC 102 (not shown) so that the system BIOS may be executed according to the data of the EC 102. Keyboard 112, touchpad 113 and mouse 114 generate user-input signals or scan codes which are sent to KBC 1020 of EC 102. Specific command signals may trigger KBC 1020 to perform certain operations. Input signals may also be sent to the South Bridge 1044 (or, South Bridge 1044 may access the signals from KBC 1020) for further processing. The key(s) 110 in FIG. 1 may be a predetermined single key or a combination of alphanumeric/non-alphanumeric keys or function keys configured on the keyboard 112, or physical button(s) on the portable computer 10 not located on the keyboard 112 (such as function buttons on the housing of the portable computer 10). For keys of the keyboard 112, the security signal is scan codes sent to the KBC 1020 for processing. For a physical button located outside the keyboard 112, a hardwired signals may be generated which is used as the security signal. In other embodiments, an infrared module may be connected to the EC 102 and communicate with an external infrared remote device. If the key 110 is configured on the external infrared remote device, the EC 102 may receive the security signal remotely through the infrared module. The touchpad 113 and mouse 114 also may generate security signals provided that operation signals of the touchpad 113 and/or mouse 114, including click signals of the key(s) on touchpad 113 and/or mouse 114, or signals of designated operating traces of touchpad 113 and/or mouse 114, are defined to be recognized by the KBC 1020 or EC 102 in the power-off mode of the portable computer 10. In some embodiments, the security signal may be generated by a combination of operations of at least two of the aforesaid input devices such as keyboard 112, touchpad 113, mouse 114 and infrared module/infrared remote device.

The EC 102 in the present invention remains powered on and activated when the portable computer 10 is in the power-off mode. If the portable computer 10 is connected to the external power input or is at the AC-mode while in the power-off mode, EC 102 is supplied with electricity from the external power input. If the portable computer 10 is disconnected from the external power input or is at the battery-mode while in the power-off mode, the EC 102 is supplied with electricity from the battery 1082.

The EC BIOS ROM 1021 stores EC BIOS which includes management routines executable by EC 102, such as a power-off-mode security routine that is executed by the EC 102 to at least partially perform the security operating method in the power-off mode of the portable computer 10.

Figure 2:
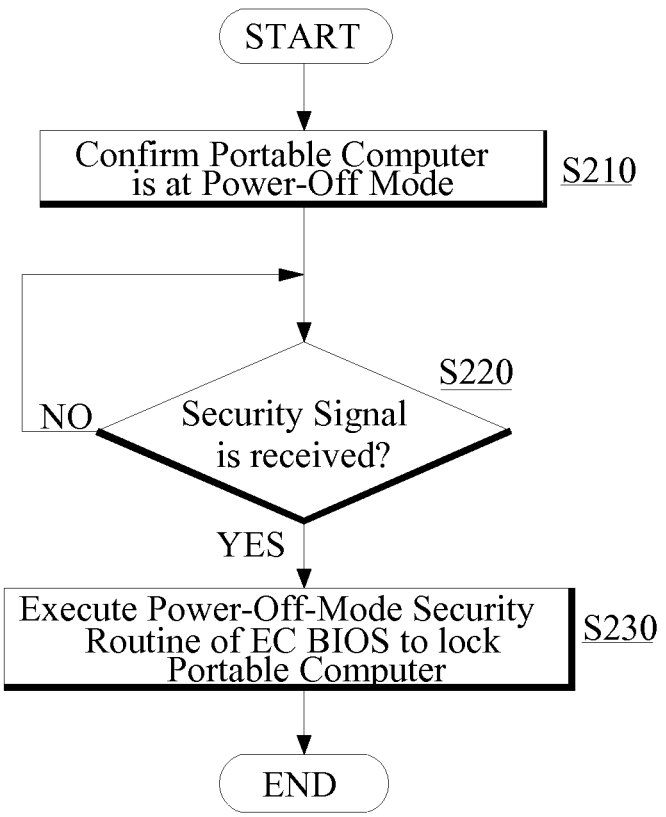
FIG. 2 is a flow chart of the security operating method for the portable computer according to another embodiment of the present invention.

FIG. 2 is a flow chart of the security operating method for the portable computer according to another embodiment of the present invention. First of all, the EC 102 is adapted to determine whether the portable computer 10 is in power-off mode (Step S201). One way to determine if the portable computer is in power-off mode is to determine that system power is not being supplied to the computer host 104. One or more of the components within the computer host 104, including CPU 1041, North Bridge 1042, system memory 1043 and South Bridge 1044, may be be used to monitor whether or not system power is being supplied thereto.

When in the power-off state of the portable computer 10, the EC 102 is configured to determine whether EC 102 receives a security signal (Step S202). The security signal may be: (1) scan codes generated by a predetermined single key or a combination of alphanumeric/non-alphanumeric keys or function keys configured on the keyboard 112; (2) a hardwired signal generated by physical buttons located outside the keyboard 112; (3) operation signals generated by clicking the keys of the touchpad 113 and/or mouse 114, or generated by designated operating traces of touchpad 113 and/or mouse 114; (4) a signal sent through the infrared module and generated by key(s) configured on the external infrared remote device, as described above.

If EC 102 receives the security signal, EC 102 is adapted to execute a power-off-mode security routine of EC BIOS to lock the portable computer 10 (Step S230). Two exemplary power-off-mode security routines to be implemented in EC BIOS and executed by EC 102 are as follows. The first is to lock up the portable computer 10 in the power-off mode of the portable computer 10. The second is to initiate further security mechanisms in an unauthorized power-on mode (system power supplied to the computer host and boot up by system BIOS) of the portable computer 10.

Figure 3A:
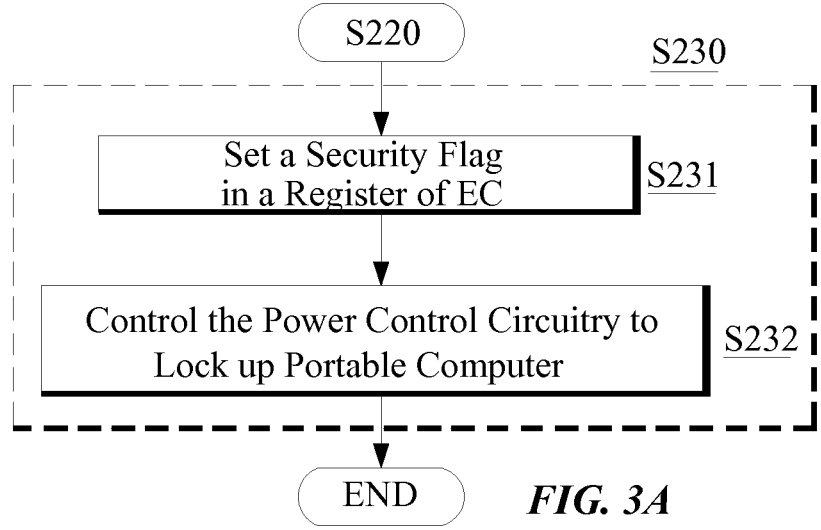
FIG. 3A is a flow chart of the security routine within EC BIOS according to an embodiment of the present invention.

Please refer to FIG. 3A, which is a flow chart of security routine within EC BIOS according to an embodiment of the present invention. First, EC BIOS sets a security flag in a specific register of EC 102 (Step S231). EC 102 is a controller chip, which generally includes a number of registers to store designated data. One of the registers in EC 102 may be assigned in advance to store the security flag corresponding to the received security signal. Next, the EC 102 is adapted to control the power control circuitry 1081 to lock the portable computer 10 (Step 232); namely, the power control circuitry 1081 ceases to supply at least part of system power. In a preferred embodiment, all the system power is cut off, even if the portable computer 10 is attempted to be powered on. Therefore, an unauthorized user will not be able to use input devices, connection ports or any non-keyboard buttons. An alarm device may be connected with and controlled by EC 102, in which case it is possible to set the alarm at power-off mode according to the set security flag of the EC 102, and activate the alarm during the next boot attempt or every subsequent boot attempt.

Aside from Step S231, the power-off-mode security routine of the EC BIOS may include additional measures. Step S232 is one. Other options to lock and secure the portable computer 10 in power-off-mode before the next boot include: (1) disabling input devices, communication ports or USB connectors, or remaining disabled; or (2) terminating bus connections of input devices, communication ports or USB connectors; terminating the hardwired communication of non-keyboard buttons. Either way mentioned above further prevent an unauthorized user to input or conduct any operation on the portable computer 10 in the power-off mode. Furthermore, for some or all security routines, hardware changes are necessary, for example setting a status monitor to allow the management host of these components mentioned above to execute the security routines.

More importantly, according to the security flag in the specific register of the EC 102 set in the power-off mode of the portable computer 10, the security routines must remain executed in any other mode of the portable computer 10 unless the security flag is removed through designated unlock procedures. Therefore, the system BIOS will read the set security flag in the specific register of the EC during any future boot, so that the security routine is maintained.

Figure 3B:
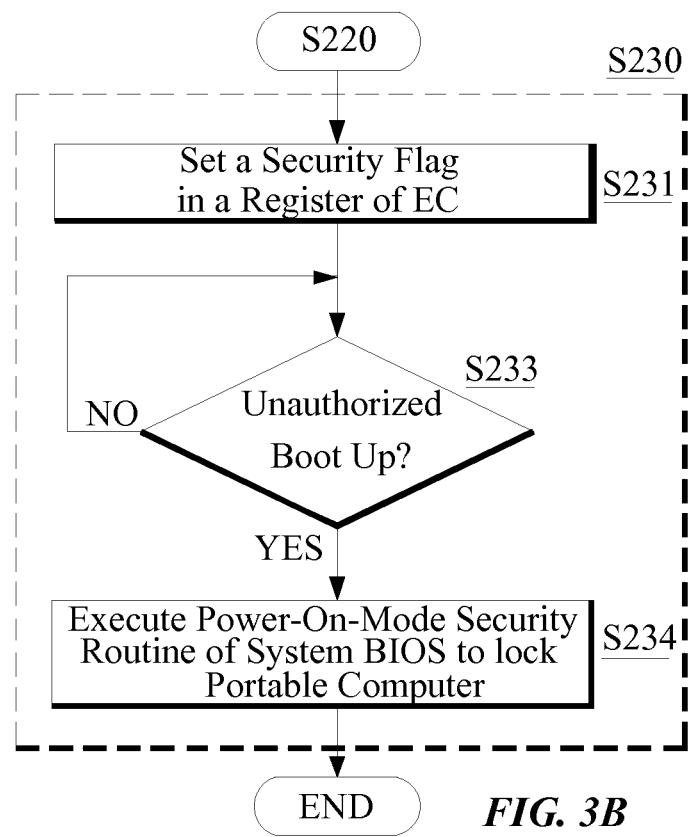
FIG. 3B is another flow chart of the security routine within EC BIOS according to another embodiment of the present invention.

Please refer to FIG. 3B, which is a flow chart of the security routine within EC BIOS according to another embodiment of the present invention. First, EC BIOS sets a security flag in a specific register of EC 102 (Step S231). Next, it is determined whether an unauthorized boot up is performed (Step S233). If a power button of the portable computer 10 is pressed and meanwhile the security flag is already set in the register of EC 102, such condition/operation will be determined as an unauthorized boot up. Afterwards, Step S234 executes a power-on-mode security routine of system BIOS to lock up the portable computer 10 according to the security flag set in Step S231. One step inherent is that in future boot the system BIOS reads the set security flag to determine to execute the power-on-mode security routine. The power-on-mode security routine may include various security mechanisms, for example automatically connecting to wire/wireless networks and sending a message to a preset email account or mobile phone number, activation of an alarm, disablement of display device 1061, or executing self-destroy operation on certain components of the portable computer.

Figure 3C:
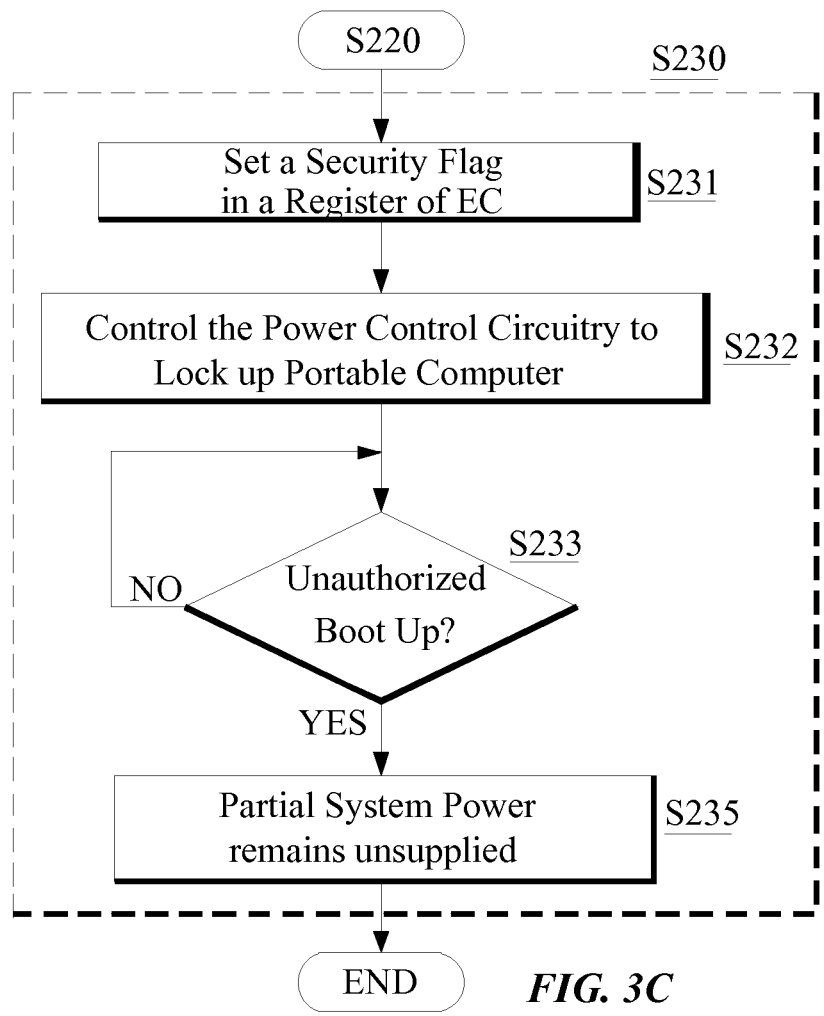
FIG. 3C is another flow chart of the security routine within EC BIOS according to another embodiment of the present invention.

Please refer to FIG. 3C. It is actually alright to boot authorized or unauthorized if Step S232 is performed in advance. Namely, Step S233 may be selectively performed after Step 232, as shown in FIG. 3C. For example, partial system power remains unsupplied even if the portable computer 10 is powered on (S235). The non-supply of system power means to cease the supply of partial system power to at least one of components/modules/subsystems of the portable computer 10, for example: keyboard 112, touchpad 113, mouse 114, infrared module, display device 1061, or hard drive 1062. Communication port(s), USB port(s) or any other input/output port(s) may be cut off.

In the embodiments of the present invention described above, security mechanism may be triggered in the power-off mode through the EC and EC BIOS. Subsequent power-on-mode security routines may be further applied to the portable computer if the power-off-mode security routine allows the portable computer to boot up.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A security operating method applied to a portable computer, the portable computer having a computer host comprising a CPU (Central Processing Unit), a system BIOS (Basic Input/Output System), an EC (Embedded Controller) in bus connection with the computer host, an EC BIOS, at least one battery, and a power control circuitry controlled by the EC, the EC comprising a KBC (Keyboard Controller), the computer host and the EC being supplied with system power from the power control circuitry in a power-on mode of the portable computer, the method comprising the steps of;

confirming, by the EC, that the portable computer is in a power-off mode, wherein in system power is supplied to the EC but not supplied to the computer host in the power-off mode, such that system power is not supplied to the CPU in the power-off mode;

receiving, by the EC, a security signal while the portable computer is in the power-off mode; and on receipt of the security signal while the portable computer is in the power-off mode, executing, by the EC, a power-off-mode security routine of the EC BIOS, wherein the power-off-mode security routine comprises one or more of the steps of the step of disabling input devices, communication ports or USB connectors, or terminating bus connections of input devices, communication ports or USB connectors, while the portable computer is in the power-off mode.

2. The method as claimed in claim 1, wherein the power-off-mode security routine further comprises the step of setting a security flag in a specific register of the EC.

3. The method as claimed in claim 2, wherein the power-off-mode security routine remains executed in any other mode of the portable computer unless the security flag is removed.

4. The method as claimed in claim 2, wherein the system BIOS reads the set security flag in the specific register of the EC during every subsequent boot such that the power-off-mode security routine remains executed.

5. The method as claimed in claim 2 further comprising the step of executing a power-on-mode security routine of the system BIOS when the portable computer is booted while the security flag is set in the specific register of the EC.

6. The method as claimed in claim 5, wherein the power-on-mode security routine comprises at least one step selected from the steps of disabling a display device of the portable computer, automatically connecting to a network and sending messages to a preset email account or mobile phone number, activating an alarm, and executing self-destroy operation on certain components of the portable computer.

7. The method as claimed in claim 1, wherein the power-off-mode security routine further comprises the step of terminating hardwired communication of non-keyboard buttons of the portable computer while the portable computer is in the power-off mode, wherein said communication terminating step remains executed when the portable computer is subsequently powered on.

8. The method as claimed in claim 1, wherein the security signal is generated by at least one input device, or by at least one hardwired button of the portable computer in circuit connection with the EC.

9. The method as claimed in claim 1, wherein the power-off-mode security routine further comprises preventing system power from being supplied to the computer host when the portable device is powered on.

10. A portable computer, comprising:

a computer host including at least one CPU (Central Processing Unit), at lease one system memory, a north bridge and a south bridge in bus connections with each other;

a system BIOS (Basic Input/Output System) ROM (Read-Only Memory), being in bus connection with the south bridge and having a system BIOS stored therein;

an EC (Embedded Controller), comprising a KBC (Keyboard Controller) and being in bus connection with the south bridge, wherein the EC remains activated when the portable computer is in a power-off mode, and wherein power is not supplied to the computer host when in the power-off mode, such that system power is not supplied to the CPU in the power-off mode;

a EC BIOS ROM, being in bus connection with the EC and having a EC BIOS stored therein, the EC BIOS comprising a power-off-mode security routine; and a power device in circuit connection with the EC and controlled by the EC, the power device receiving electricity from an external power input and a battery, and then outputting a system power to the portable computer;

wherein the EC is operable such that in the power-off mode of the portable computer and upon receipt of a security signal, the EC executes the power-off-mode security routine of the EC BIOS, wherein the power-off-mode security routine disables input devices, communication ports or USB connectors, or terminates bus connections of input devices, communication ports or USB connectors, while the portable computer is in the power-off mode.

11. The portable computer as claimed in claim 10, wherein a security flag is set in a specific register of the EC in the power-off mode of the portable computer and upon receipt of the security signal.

12. The portable computer as claimed in claim 11, wherein the power-off-mode security routine remains executed in any other mode of the portable computer unless the security flag is removed.

13. The portable computer as claimed in claim 12, wherein the portable computer is operable so that a power-on-mode security routine of the system BIOS is executed when the portable computer is booted while the security flag is set in the specific register of the EC.

14. The portable computer as claimed in claim 11, wherein the portable computer is operable so that the system BIOS reads the set security flag in the specific register of the EC during every subsequent boot such that the power-off-mode security routine remains executed.

15. The portable computer as claimed in claim 10, wherein the power-off-mode security routine further comprises termination of hardwired communication of at least one hardwired button of the portable computer, or termination of bus connection of at least one of an input devices, a communication port or an USB port of the portable computer, wherein said termination remains when the portable computer is subsequently powered on.

16. The method as claimed in claim 10, wherein the power-off-mode security routine further comprises preventing system power from being supplied to the computer host when the portable device is powered on.

* * * * *